United States Patent [19]

Labelle

[11] Patent Number: 4,547,160
[45] Date of Patent: Oct. 15, 1985

[54] EDUCATIONAL BUILDING TOY

[76] Inventor: Richard Labelle, 132 Wellington St., Apt. 17, North Sherbrooke, Canada, J1H 5C5

[21] Appl. No.: 643,351

[22] Filed: Aug. 21, 1984

[51] Int. Cl.⁴ .................. G09B 1/40; A63H 33/08; A63F 9/20

[52] U.S. Cl. .................. 434/195; 446/103; 446/107; 273/292

[58] Field of Search .................. 434/195, 401; 446/85, 446/107, 116, 119, 123, 124, 126, 103; 273/292

[56] References Cited

U.S. PATENT DOCUMENTS

| | | | |
|---|---|---|---|
| 615,818 | 12/1898 | Dexter | 273/292 |
| 1,428,206 | 9/1922 | Benton | 434/195 |
| 1,701,190 | 2/1929 | Paulson | 446/123 |
| 3,094,792 | 6/1963 | Morgan et al. | 434/195 |
| 3,229,388 | 1/1966 | Smith | 434/195 |
| 3,452,454 | 2/1967 | Easton | |
| 3,672,681 | 6/1972 | Wolf | 446/119 X |
| 3,987,579 | 10/1976 | Palenik, III | 446/124 X |

FOREIGN PATENT DOCUMENTS

| | | |
|---|---|---|
| 858781 | 12/1970 | Canada . |
| 935992 | 10/1973 | Canada . |
| 949745 | 6/1974 | Canada . |
| 1079522 | 6/1980 | Canada . |

*Primary Examiner*—William H. Grieb

[57] ABSTRACT

An educational and building toy including a set of blocks of different lengths, having spaced-apart holes the number of which is determined by the proportional length of the block relative to a unit length. A plurality of discs and wafers are also provided, having holes and also indicia opposed thereon for the arithmetical operations of addition, subtraction, multiplication and division, and the cardinal numerals from one to ten, respectively. A plurality of flexible rods having axially-extending and circumferentially spaced ridges are provided. The peaks of the ridges define an outer diameter slightly larger than the diameter of holes in the blocks, discs and wafers, whereby a friction fit is obtained between the rods and perforated pieces to build different objects. The discs have a peripheral flange and a hub. The flange of some of the discs has inner gear teeth for meshing with the rod ridges. The hub hole of some of the discs have indentations for making a spline connection with the rod ridges.

18 Claims, 13 Drawing Figures

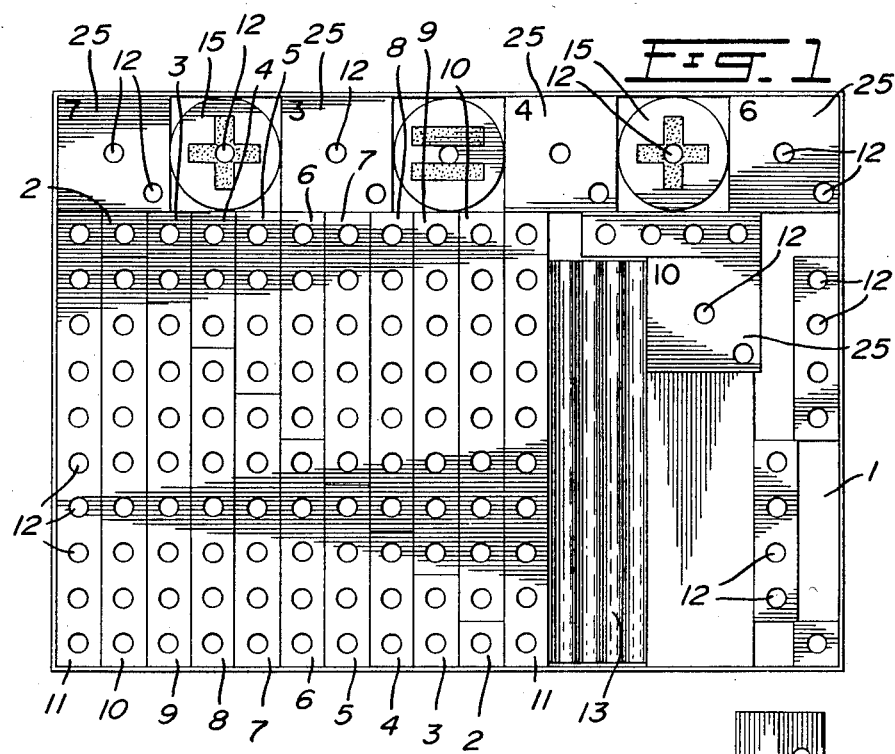
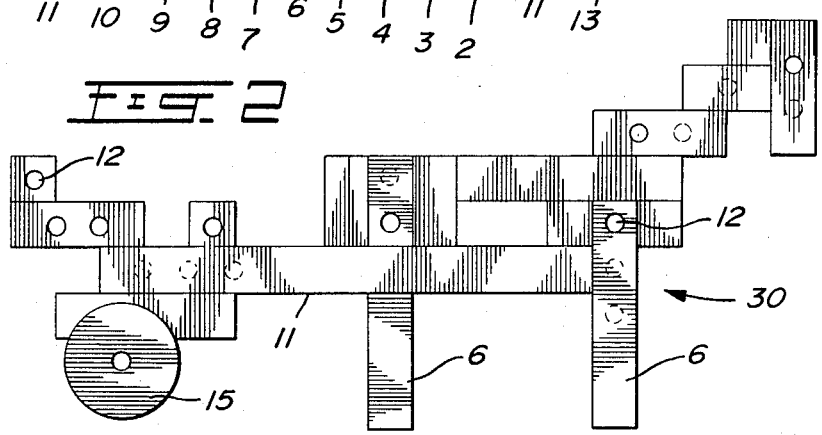
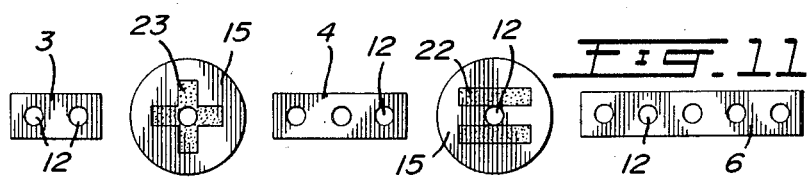
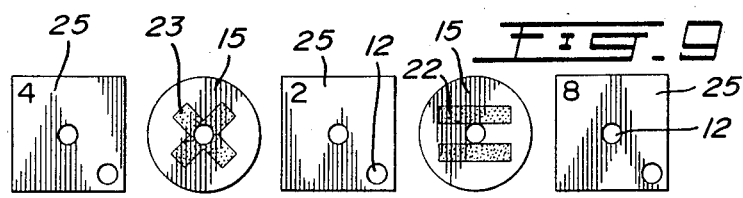

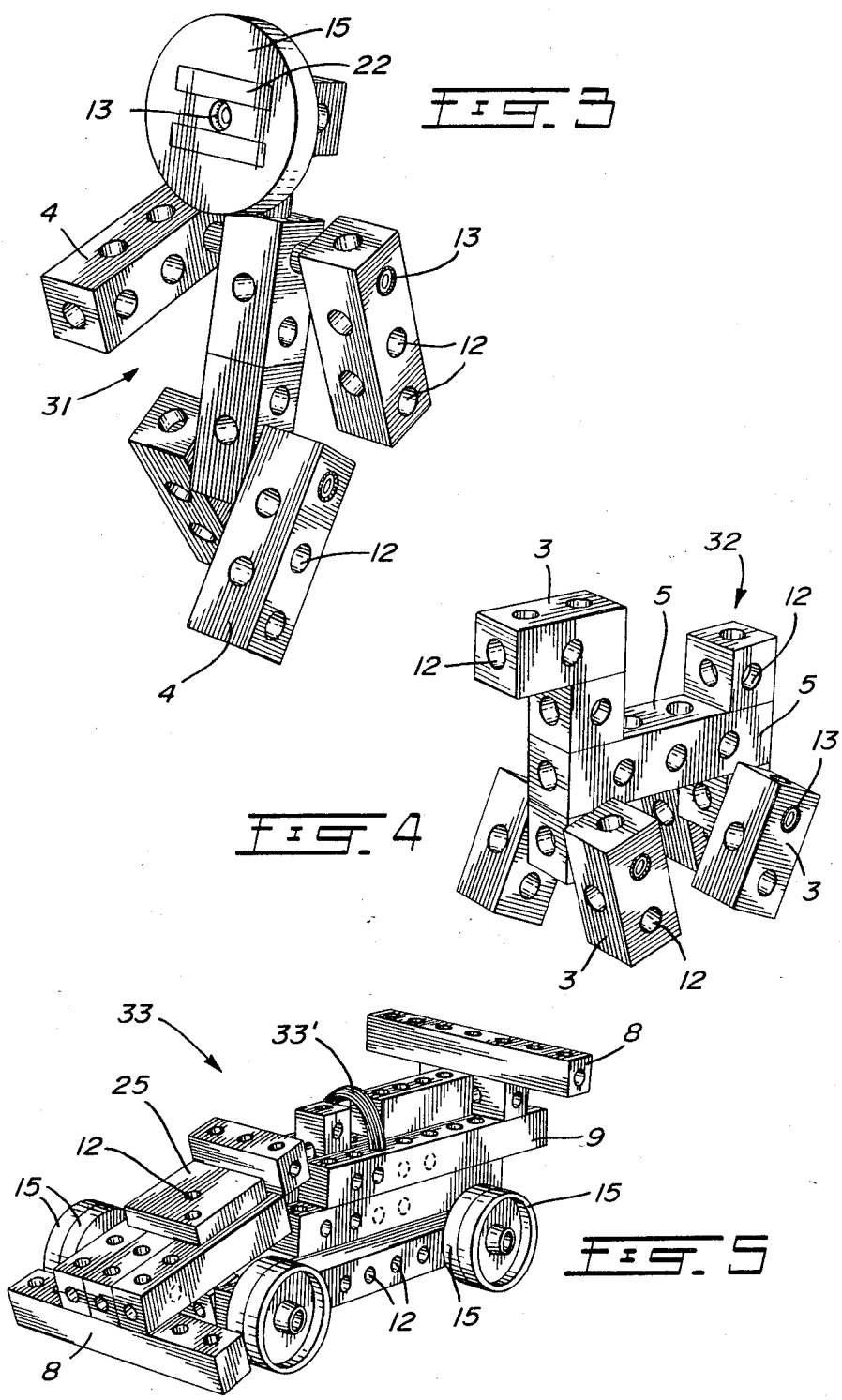

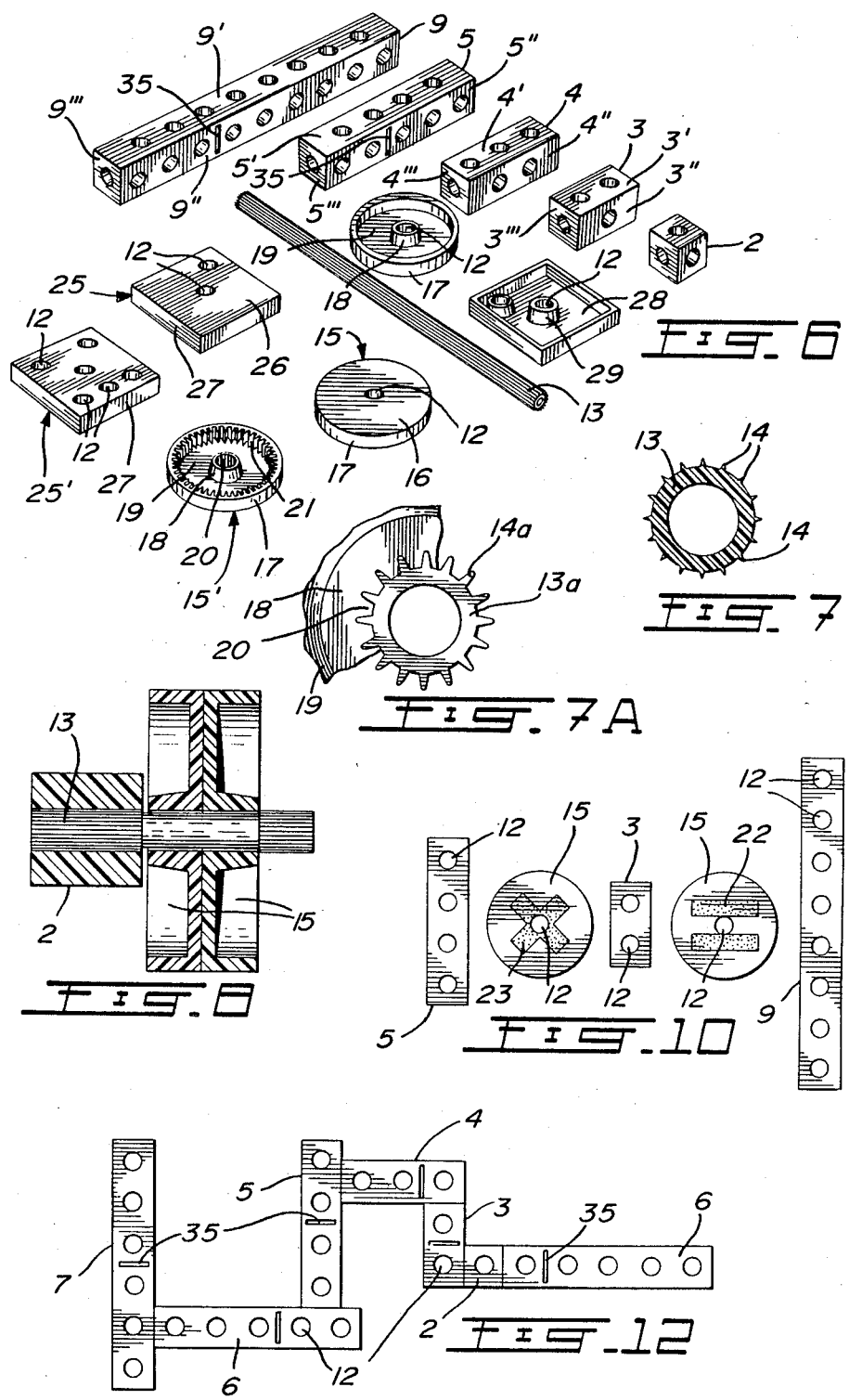

EDUCATIONAL BUILDING TOY

FIELD OF THE INVENTION

The present invention relates to educational toys, more particularly to a set of manipulable elements which may be used by children primarily to build and assemble objects and structures but also to learn mathematical operations and symbols and, hence, the concepts of basic arithmetic they represent.

BACKGROUND OF THE INVENTION

By the time children are of preschool age (around four), they possess a vastly-increased ability to distinguish between various stimuli; call and remember objects by name and, in general, are capable of learning, thinking, perceiving and solving problems. One of the important ways in which children grow intellectually is by playing games. These games are perhaps most stimulating and interesting for both boys and girls when they involve creative activity.

Since children, if not stifled, are naturally curious and enjoy clutching, grasping and manipulating different objects. A set of toy blocks designed especially for children, aged four and older, would prove to be educational as well as enjoyable if the blocks are adapted to teach basic arithmetic and also to give a visual representation of metric units of lengths and volumes.

A search of the prior art reveals several different toys which are intended to be educational. For example, U.S. Pat. No. 3,094,792, dated June 25, 1963 to Morgan et al and entitled: EDUCATIONAL TOY, teaches the use of a set of blocks of different lengths, each one being proportionally as long as the numerical value it designates. The purport of the patent is to give a child a visual and sensual or physical presentation of number relationships. However, the patent is limited spatially to the combinations of shapes shown in the Figures, not being intended as a toy with which different objects can be built.

Other educational toys in the prior art have, in general, similar limitations. Moreover, they are frequently complicated or difficult to manipulate for small children, thereby reducing the possibilities of creative and educational play which children experience in their imagination.

OBJECTS OF THE INVENTION

In view of the above, it is a first object of the present invention to provide an educational toy which is highly interesting to children of the age of four and upwards in terms of objects that can be built from the elements of the toy and which may also serve to teach the basic operations of arithmetic.

It is another object of the present invention to provide a set of toy elements of the above type, which lends itself to playing a game similar to the game of dominos.

It is still another object of the invention to provide a set of toy elements of the above type, which is inexpensive to manufacture.

SUMMARY OF THE INVENTION

The above and other objects and advantages of the present invention are realized according to a preferred embodiment comprising a set of play elements consisting of the following pieces:

(a) a plurality of toy blocks of generally rectangular cross-section and being of proportionally-graduated lengths, i.e. including at least one first block of one unit length, at least one second block double the length of the first block, etc., also including at least one block of a limit length which is an integral multiple of the unit length of the first block. The latter is provided with a hole along at least one of its axes which extends entirely through the block. Similarly, each block of successively-increasing length is provided with a number of holes equivalently spaced apart and along at least one axis thereof, the number of holes corresponding to the given multiple of unit length.

(b) A plurality of rods made of flexible material and preferably hollow. Each rod is formed with several axially-extending and circumferential ridges, preferably in the form of gear teeth, the peaks of which define an outer diameter. The latter is slightly larger than the diameter of the holes in the blocks. Portions of the rods may be formed without the ridges to define a smooth outer surface.

(c) A plurality of discs having a central hole of the same diameter as the holes in the blocks. According to a second embodiment of these discs, there is provided a central hole having axial splines adapted to precisely and firmly receive the ridges of the rods to make a non-rotatable connection. This second embodiment of the discs is also preferably formed with a tangential flange at its circumference, the inner surface of the flange being provided with indentations forming gear teeth which can mesh with the rod gear teeth, whereby a gear connection can be made between a rod and the disc of the second embodiment. Optionally, the faces of the discs may be provided with removable indicia for the four basic arithmetical operations of addition, subtraction, multiplication and division.

(d) A plurality of rectangular wafers having a central hole equal in diameter to the holes made in the blocks and at least one diagonally-spaced second hole located in one of the corners of the wafer. Preferably, the faces of the wafers are provided with removable indicia of the cardinal numerals from one to ten inclusively, a different numeral on each wafer.

The above-listed pieces may, it will be appreciated, be combined and assembled into structures of widely-differing character and shape, including wheeled vehicles and motorized objects. Further, the wafers and discs provided with indicia may serve to teach, graphically, basic arithmetic.

Preferably, the blocks of various lengths are colour-coded as are the other pieces.

The above will be more clearly understood by having referral to the preferred embodiment of the invention, illustrated by way of the accompanying drawings, in which:

FIG. 1 is a top plan view of a tray or open-top box containing a representive selection of the play pieces according to the invention;

FIG. 2 is a side elevation of a horse and chariot construction made with the pieces of the invention;

FIGS. 3 to 5 are perspective views showing three other constructions made with the play pieces of the invention;

FIG. 6 is a perspective view of several of the blocks, rod 3, discs and three wafers according to the above invention;

FIG. 7 is a cross-section of the rod of FIGS. 1 and 6;

FIG. 7a is an end view of the second embodiment of the rod;

FIG. 8 is an elevation view of a rod having a smooth intermediate portion, also showing in vertical cross-section a block frictionally secured to the rod and a pair of face-to-face discs rotatably mounted around the smooth portion of the rod and serving as a wheel;

FIG. 9 is a top plan view of two discs and three wafers used to depict a simple arithmetical operation;

FIG. 10 is a view similar to that of FIG. 9, wherein the wafers are replaced by blocks;

FIG. 11 is another top plan view showing two discs and three blocks, also showing how one disc can be rotated forty-five degrees to represent the operation of addition; and FIG. 12 is a top plan view of a plurality of blocks, provided with transverse grooves on one of their faces and adapted to play the game of dominos.

Like reference characters indicate like elements throughout the drawings.

DETAILED DESCRIPTION OF THE PREFERRED EMBODIMENT

Referring to FIGS. 1 and 6, the toy of the invention comprises, preferably, a box or tray 1 to contain all the different play pieces. The latter consists, firstly, of a plurality of blocks all having a square cross-section and including a first block 2 in the shape of a cube and of one-unit length; a second block 3 of two-unit length, a third block 4 of three-unit length, a fourth block 5 of four-unit length, a fifth block 6 of five-unit length, etc., the largest block 11 being of ten unit length. Thus, the blocks 2, 3, 4, 5, 6, 7, 8, 9, 10, and 11 are rectangular prisms. They are preferably made of a non-toxic plastic, such as polystyrene. Each different length is preferably of a different colour.

The first block 2 is formed with through holes 12 along each of its three axes, all communicating with one another centrally in the cube.

The second block 3 of two-unit length has two spaced-apart through holes 12 opening at two parallel opposite faces 3 and extending through the block. The other two opposite lengthwise faces 3" are each formed with a single hole 12 which is longitudinally staggered relative to holes 12. The formed hole 12 also extends entirely through block 3. The end transverse faces 3''' of block 3 are each provided with single holes 12 which, however, do not extend entirely through the block, only communicating with the nearest hole 12 in faces 3'.

Similarly, third block 4 has three holes 12 extending therethrough and opening into a first pair of opposite faces 4', while the two other opposite lengthwise faces 4" are formed with two holes 12 which are longitudinally staggered relative to holes 12. Transverse opposite end faces 4''' are each provided with single holes 12 communicating with adjacent holes 12 in faces 4' respectively.

Thus, excepting first block 2, blocks 3 to 11 are all characterized by one pair of opposite faces having as many holes as the multiple of the unit length of block 2; and the same number of holes less one in the other pair of lengthwise-extending faces. The transverse end faces of all the blocks are each provided with a single hole 12 communicating with the adjacent hole formed in the first-named pair of faces. This particular arrangement of holes 12 in the blocks makes possible a multiplicity of figures, as will be seen.

Still referring to the same two figures and FIG. 7, an essential feature of the present invention resides in the provision of a plurality of novel rods 13 and/or 13a. Each rod 13 or 13a is made of a flexible plastic material, such as polyethylene, and has a circular hollow cross-section (FIG. 7 and FIG. 7a).

Rods 13 and 13a are made with a plurality of equally-spaced circumferential ridges 14 and 14a, respectively, extending longitudinally. Ridges 14 are of a substantially triangular cross-section while ridges 14a have the shape of gear teeth. The peaks of ridges 14 or 14a define collectively an outer diameter. The latter is only slightly greater than the diameter of holes 12. Therefore, a rod 13 or 13a is frictionally insertable into any hole 12 of the blocks, such that the peaks will be slightly deflected in a hole 12 to provide a fairly tight fit, but a fit which is easily undone.

Rods 13 or 13a are cut in any suitable length or combination of lengths, the representations in the figures being only one example of a preferred length. These rods can also be easily cut by the user.

Another important feature of rods 13 or 13a is that ridges 14 or 14a can be easily removed from a portion of the total rod length to define a smooth inner diameter at that portion, for a reason to be explained below.

The set of play elements further includes a plurality of discs 15. Discs 15 are of two preferred embodiments: the first embodiment includes a flat face 15', a circumferential flange 17 extending away from the face 16 and a central hub 18 having a hole 12 formed therein, hub 18 projecting out of the other face 19. The second embodiment 15' is similar, differing in that hub 18, and its hole 12 is formed with longitudinally-oriented and regularly-spaced indentations 20 in the form of gear teeth corresponding in number and shape to gear-tooth shaped ridges 14a of the rods 13a. Thus, one of the latter can be fitted as a spline into the hole of hub 18, so that both rod 13 and disc 15' can only move bodily and not relative to one another. Disc 15' further differs by having a circumferential set of identical indentations forming gear teeth 21, all around the inner surface of flange 17. This construction makes possible the use of rod 13a as a driving pinion meshing with the internal gear teeth of disc 15' to form a drive train with tube 13a fixed to the drive shaft of a small electric motor.

The scope of the invention further encompasses the provision of arithmetical indicia to be adhered on the faces of discs 15 and 15'. The indicia include an "equal sign" 22, a "multiplication sign" 23, a "subtraction sign" (not shown), and a "division sign" (not shown). Preferably, the indicia are embodied by decals. The multiplication sign also serves as an "addition sign" simply by placing a disc 15, 15' on which it is opposed at a turn of forty-five degrees relative to the multiplication sign. FIGS. 10 and 11 illustrate the use of discs 15,15' with selected blocks to give an example of how the operations of addition and multiplication are taught by the invention.

Still referring to FIGS. 1 and 6, there are shown several wafers 25, all identical and of square configuration. Wafers 25, like the discs, include a second embodiment 25'.

Wafers 25 are made of same plastic material as the discs and the blocks. Each has a flat face 26 and a perimetrical flange 27 extending away from the flat face. The other face 28 is made with another central hub 29 having a central hole 12. One of the corners of wafer 25 is provided with a second hole 12.

Each wafer 25' is of the same construction but is further provided with four corner holes 12 and a middle hole 12 pierced in one side of the wafers to allow for a greater variety of objects which may be built with them.

FIG. 9 depicts how wafers 25 can be substituted for the the blocks when used to present the arithmetical operations. Such is achieved by printing or otherwise provided the flat face 26 of each wafer with the symbols of the cardinal numbers from 1 to 10. Of course, there may be several wafers bearing the same numerals.

Referring specifically to FIG. 8, there are shown two discs 15 in face-to-face axially-aligned relationship to make a wheel. The rod 13 shown therein has a portion passing through the two holes 12 which is devoid of ridges 14, leaving a diameter which is slightly smaller than that of holes 12. Thus, the wheel formed by the two discs 15 can rotate freely about rod 13 and the latter serves as an axle. The same result is obtained using rod 13a without teeth 14a along a portion of its length, and associated with discs 15 or 15'.

It will be readily appreciated that a wide variety of objects can be built with the elements described above. FIGS. 2 and 3 to 5 suggest some objects: a horse-drawn buggy 30, a human walking figure 3', a dog 32 and a racing car 33, respectively. FIG. 5 specifically shows one of the uses of a rod 13 made possible by its flexibility; it is bent to resembly a roll-bar 33' in the racing car.

Referring finally to FIG. 12, an illustration is given of how the blocks may be used to play the game of dominos which in itself is arithmetically instructive. To achieve this use of the blocks, each of the latter is provided with a shallow transverse slot 35 in one of the first-named lengthwise faces. Slots 35 thus divide the number of holes in the face into two groups with all of the possible permutations ranging from a single hole in one group to nine holes in one group. For example, FIG. 12 shows that the two blocks 6 define two different groups of holes 12, one block with groups of three and two holes and the other block with groups of four and one holes. As shown, each slot 35 terminates short of the edges of the face, so that a player may conceal the exact denomination of the two groups of holes 12 before putting his or her pieces into play, as in dominos played with standard pieces.

What I claim is:

1. An educational building toy comprising a plurality of toy blocks, of generally square cross-section and being of proportionally-graduated lengths; including a first cubic block of one-unit length, the remaining blocks each having a length which is an integral multiple of the length of said first block; said first block being provided with a first hole extending entirely therethrough along at least one its axes; each said remaining block being provided with a number of lengthwisely equivalently spaced-apart first holes extending thereacross and opening at a first pair of opposite side faces thereof; said number of first holes corresponding with the given multiple of unit length of each of said remaining blocks; all of said holes having the same diameter; further comprising a plurality of rods of circular cross-section and made of resilient material; each said rod being formed with a plurality of axially-extending circumferentially-spaced ridges having peaks; said peaks defining an outer diameter slightly greater than the diameter of said holes, whereby said ridges will be slightly deflected when said rod is inserted into any one of said holes to provide a friction fit therebetween the end faces of each said block, including said first block, being formed with second holes which communicate only with the adjacent one of said first-named holes respectively, said first block being provided with a third hole extending thereacross and normal to said first and second holes thereof, each of said remaining blocks being provided with a number of third holes extending thereacross and opening at the second pair of opposite side faces thereof; said third holes of said remaining blocks being lengthwisely staggered relative to the first holes of said remaining blocks and being one less in number, some of said rods being formed with at least one intermediate portion therealong that has none of said ridges, thereby defining a smooth outer diameter, the toy further comprising a plurality of discs having a flat first face provided with a central hole of the same diameter as the other said holes; a circumferential flange extending away from said flat face; and a hub projecting from the other face and containing said central hole.

2. An educational building toy as defined in claim 1, wherein the periphery of the central hole of some of said discs is formed with a plurality of indentations, axially oriented and regularly spaced, corresponding in number and shape to said ridges, whereby said rod can be fitted therein in a spline connection.

3. An educational building toy as defined in claim 1, wherein the inner surface of said flange is formed with a set of second indentations similar in shape to the ridges of said rod, said second indentations and ridges forming meshing gear teeth, whereby a gear connection can be made between a rod and said disc.

4. An educational building toy as defined in claim 1, wherein said first face is provided with one of four indicia for each of the arithmetical operations of addition, or multiplication, subtraction, division and for the equation sign.

5. An educational building toy as defined in claim 1, wherein the toy further comprises a plurality of wafers of square configuration, each having a flat first face and a perimetrical flange extending away therefrom; a central hole extending through a hub formed therefor on the reverse face and a second hole diagonally spaced from said central hole.

6. An educational building toy as defined in claim 5, wherein some of said wafers are further provided with a hole in each corner thereof and an additional hole formed in one of the sides of the wafers between two of said holes of said corners.

7. An educational building toy as defined in claim 5, wherein said first face is furthr provided with indicia for the cardinal numerals from one to ten, a different numberal on each wafer.

8. An educational building toy as defined in claim 5, wherein said blocks, said discs and said wafers are of contrasting colours.

9. An educational building toy as defined in claim 1, wherein one of the first pair of side faces of said remaining blocks is provided with a transverse slot terminating short of the edges of said one side face to separate said holes into two groups according to all the permutations possible for each of said remaining blocks, whereby said blocks can be used to play dominos.

10. An education building toy comprising a set of toy blocks of generally square cross-section of proportionally-graduated lengths and each having transverse holes opening at a pair of opposite said faces of said blocks, all of said holes having the same diameter; further comprising a plurality of rods of circular cross-section and made of resilient material; each said rod being formed with a plurality of axially-extending circumferentially-spaced ridges having peaks; said peaks defining an outer diameter slightly greater than the diameter of said holes, whereby said ridges will be slightly deflected when said rod is inserted into anyone of said holes to provide a friction fit therebetween, some of said rods being formed with at least one intermediate portion therealong that has none of said ridges, thereby defining a smooth outer diameter, and further including a plurality of discs having a flat first face provided with a central hole of the same diameter as the said holes of said blocks; a circumferential flange extending away from said flat face; and a hub projecting from the other face and containing said central hole.

11. An educational building toy as defined in claim 10, wherein the periphery of the central hole of some of said discs is formed with a plurality of indentations, axially oriented and regularly spaced, corresponding in number and shape to said ridges, whereby said rod can be fitted therein in a spline connection.

12. An educational building toy as defined in claim 11, wherein the inner surface of said flange is formed with a set of second indentations similar in shape to the ridges of said rod, said second indentations and ridges forming meshing gear teeth, whereby a gear connection can be made between a rod and said disc.

13. An educational building toy as defined in claim 10, wherein the inner surface of said flange is formed with a set of second indentations similar in shape to the ridges of said rod, said second indentations and ridges forming meshing gear teeth, whereby a gear connection can be made between a rod and said disc.

14. An educational building toy as defined in claim 10, wherein the toy further comprises a plurality of wafers of square configuration, each having a flat first face and a perimetrical flange extending away therefrom; a central hole extending through a hub formed therefor on the reverse face and a second hole diagonally spaced from said central hole.

15. An educational building toy as defined in claim 14, wherein some of said wafers are further provided with a hole in each corner thereof and an additional hole formed in one of the sides of the wafer between two of said holes of said corners.

16. An educational building toy as defined in claim 14, wherein said first face is further provided with indicia for the numerals from one to ten, a different numeral on each wafer.

17. An educational building toy as defined in claim 14, wherein said blocks, said dics and said wafers are of contrasting colours.

18. An aducational building toy as defined in claim 10, wherein one of said pair of opposite side faces of those blocks having two holes and more, is provied with a transverse slot terminating short of the edges of said one side face to separate said holes into two groups according to all the permutations possible for each of said first-named blocks, whereby said blocks can be used to play dominos.

* * * * *